G. DONAT.
CUTTER FOR CUTTING PAPER BOARD.
APPLICATION FILED MAR. 8, 1912.
1,034,088.
Patented July 30, 1912.
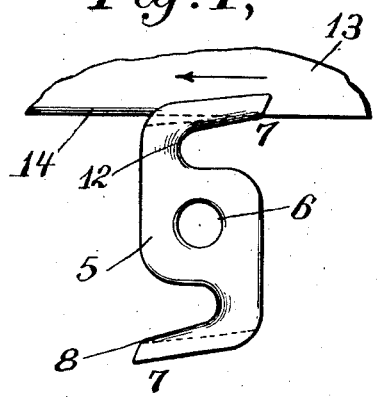
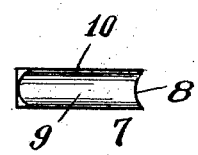
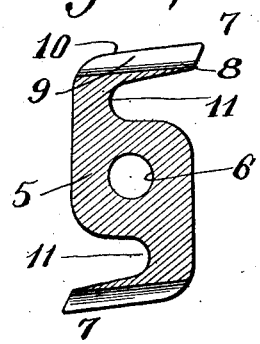
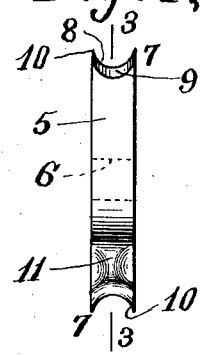
WITNESSES
K. O. Hasel
W. Lunny.
INVENTOR
Gustavo Donat.
BY
Willis Fowler
ATTORNEY

UNITED STATES PATENT OFFICE.

GUSTAVO DONAT, OF PASSAIC, NEW JERSEY, ASSIGNOR OF ONE-HALF TO ERASTUS BLAUVELT, OF PASSAIC, NEW JERSEY.

CUTTER FOR CUTTING PAPER-BOARD.

1,034,088.  Specification of Letters Patent.  Patented July 30, 1912.

Application filed March 8, 1912.  Serial No. 682,360.

*To all whom it may concern:*

Be it known that I, GUSTAVO DONAT, a citizen of the United States, residing in Passaic, county of Passaic, State of New Jersey, have invented certain new and useful Improvements in Cutters for Cutting Paper-Board, of which the following is such a full, clear, and exact description as will enable any one skilled in the art to which it appertains to make and use the same, reference being had to the accompanying drawings, forming part of this specification.

My invention relates to a rotary cutter which is particularly adapted for cutting a smooth round edge on artificial fiber-board such as paper-board that is generally used in putting up bolts of cloths and different fabrics. In the use of these fiber boards, the long edges are rounded to prevent injuring the fabric which is generally wound tightly around the board, and heretofore in trimming these edges it has been found difficult to obtain a smooth finish. This drawback is overcome by my particular form of rotary cutter by means of which I am able to obtain a very smooth finish to the rounded edges of the fiber board.

I have illustrated my invention in the accompanying drawings, wherein:

Figure 1 is a side view of my improved rotary cutter, shown as acting upon a piece of paper-board. Fig. 2 is an end view of the cutter looking into the concavity of the grooved blade. Fig. 3 is a central sectional view of the cutter, the plane of the section being indicated by the line 3—3 in Fig. 4. Fig. 4 is an edge view of the cutter.

Referring to the drawings, in which like numbers of reference designate like parts throughout, 5 is the body of the cutter which is provided with a central perforation 6 by means of which the cutter is mounted on a rotating shaft. The cutter may be provided with one or more of the blades 7, which is of a peculiar construction. In the present construction I show two of these blades on each cutter and these blades are gouge shaped with the ends pointing in the direction of rotation of the cutter and with the cutting edge curved inwardly at 8. The groove 9 of the gouge shaped blade lies outwardly and conforms somewhat to the rounded shape in which the board is cut. The edges 10 of the gouge shaped blade are substantially in a plane that is parallel with the axis of rotation of the cutter and a line drawn longitudinally through the bottom of the groove 9 makes a very small acute angle with the edge of the board when the cutting edge 8 of the blade is in contact therewith as shown in Fig. 1, so that the blade at once clears the edge after it has cut the board. A recess or throat 11 is formed between the free end of the blade 7 and the body of the cutter, for clearance of the chips which the cutter removes from the edge of the board in the cutting process and this prevents clogging of the cutter in its operation. The body of the cutter is rounded at 12 at the closed end of the recess 11 to facilitate the chips passing by the cutter as it is rotated. The groove 9 is made sufficiently deep and the curved cutting edge 8 of the blade is made sufficiently long to span the edge of the board 13 so as to fully round it. It will be noted that the gouge shaped blade is very thin in its cross-section, thereby leaving the minimum thickness of the gouge bed practicable. The paper-board 13 being fed in the direction of the adjacent arrow in Fig. 1, and the cutter rotating in the direction in which the hands of a clock move, the gouge shaped blade meets the material on which it acts at a very small acute angle, whereby the resulting cutting action is on the order of whittling. This produces a very clean cut which leaves the rounded edge of the fiber-board smooth. From actual use of this cutter with the paper-board hereinbefore referred to, I find that the peculiar form of the thin gouge shaped blade of my improved cutter produces a remarkably smooth, round edge.

Having thus described my invention, what I claim and desire to secure by Letters Patent is:

1. A rotary cutter head having one or more forwardly projecting thin gouge shaped blades with the grooved face thereof lying outwardly and meeting the material on which it acts at a very small acute angle leaving the minimum thickness of gouge bed practicable, substantially as described.

2. A rotary cutter head for cutting artificial fiber board having one or more forwardly projecting thin gouge shaped blades with the grooved face thereof lying outwardly and meeting the material on which it acts at a very small acute angle leaving the minimum thickness of the gouge bed practicable, substantially as described.

In testimony whereof, I have hereunto set my hand in the presence of the two subscribing witnesses.

GUSTAVO DONAT.

Witnesses:
WILLIS FOWLER,
HARRY PICKETT.

Copies of this patent may be obtained for five cents each, by addressing the "Commissioner of Patents, Washington, D. C."